Oct. 24, 1939.                T. D. BARNES                2,177,274
                       WATT-HOUR METER COMPENSATION
                          Filed April 28, 1938

Progressively Saturating Shunts

WITNESSES:
N. F. Susser
C. L. Freedman

Non-Magnetic Material

INVENTOR
Thomas D. Barnes.
BY
ATTORNEY

Patented Oct. 24, 1939

2,177,274

UNITED STATES PATENT OFFICE 2,177,274

WATT-HOUR METER COMPENSATION

Thomas D. Barnes, Newark, N. J., assignor to Westinghouse Electric & Manufacturing Company, East Pittsburgh, Pa., a corporation of Pennsylvania Application April 28, 1938, Serial No. 204,719

14 Claims. (Cl. 171—264)

This invention relates to a means for controlling the distribution of magnetic flux in a magnetic structure and it has particular relation to means for compensating the electromagnets of induction disk type instruments for errors produced under heavy load conditions.

Induction type instruments such as watt-hour meters ordinarily comprise a magnetic structure for producing a shifting magnetic field in which an electro-conductive disk or element is placed for rotation. As is well known, the accuracy of such instruments under normal conditions has been developed to a high level, but under overload conditions the accuracy of such instruments is unsatisfactory. One of the primary reasons for the failure of such instruments to operate successfully under overloads is based on the increased damping action of the series or current component of the driving magnetic flux. This damping action causes the disk of an instrument to rotate too slowly under excessive loads, and if the instrument is a watt-hour meter, it will register too low a quantity.

Prior art instruments of this character have employed saturable magnetic shunts for partially compensating for errors present under overload conditions. Such a shunt was placed between the series poles of the electromagnet employed in an instrument, and bypassed a portion of the flux carried by said poles away from the disk or other rotative element of the instrument. In the hunt heretofore provided the flux distribution was substantially uniform throughout the shunt, so that the shunt saturated essentially as a unit at a certain value of flux loading. This saturation resulted in a somewhat abrupt decrease of the proportion of the flux which passed through the shunt, and therefore tended to over-increase the speed of the rotative element when such saturation took place. The shunt was not entirely satisfactory because of the abrupt nature of the control which it exercised, and because of the limited range of control available.

In my prior application Serial No. 144,154, filed May 22, 1937, now Patent No. 2,162,522, issued June 13, 1939, of which this is a continuation-in-part, I have disclosed an improvement over the prior art shunt wherein a more gradual compensation of instruments is effected. This is accomplished by placing under the shunt magnetic extensions from the pole members. These extensions vary the flux distribution in the shunt to produce a high flux density at the center of the shunt which gradually falls to a lower flux density at each end of the shunt. Consequently as the flux loading increases such a shunt first saturates at its center section, and the zone of saturation gradually increases towards the ends of the shunt. Not only does this shunt effect a control because of the decrease in the rate of change of flux passing therethrough, but, due to the fact that this gradual shift towards the ends of the shunt tends to move the effective flux distribution in the pole faces of the electromagnet gradually away from the axis of the rotative element, the effective torque arm between each pole face and the disk axis is increased.

Although the shunt disclosed in my above-mentioned application is capable of a considerable range of control, I have found that a still further control may be provided by locating the shunt adjacent that portion of the electromagnet which is near to the axis of the rotative element. When such a shunt saturates not only are the controls described in the preceding paragraph effected, but an additional control is present for the reasons that as the shunt saturates the effective flux distribution in the pole face is given a component shift at right angles to the length of the shunt thereby increasing still further the effective torque arm. I provide a still further control by positioning in parallel with this shunt a second shunt which saturates at a higher value of the magnetic flux generated by the electromagnet.

It is therefore an object of my invention to provide a control means for the flux distribution in electromagnets having an extended range of control.

It is a further object of my invention to provide a plurality of shunt members for an electromagnet which saturate at different values of the magnetic flux in said electromagnet.

Another object of my invention is to provide a shunt unit for induction disk instruments which extends the accuracy of such instruments to several times the normal operating range of the instruments.

It is a further object of my invention to provide for an electromagnet subject to a variable magnetic flux, a shunt unit which exercises a series of successive controls over the flux distribution in the electromagnet.

It is a further object of my invention to provide between the poles of an induction disk instrument a shunt unit which moves the effective flux in the poles away from the disk axis as the magnetic flux in the poles increases.

It is a still further object of my invention to provide an improved and simplified construction for a unit comprising a plurality of shunt members.

Further objects of my invention will be apparent from the following description of my invention, taken in conjunction with the accompanying drawing, in which:

Fig. 7 is a view in elevation of a modification of my invention.

Figure 1:
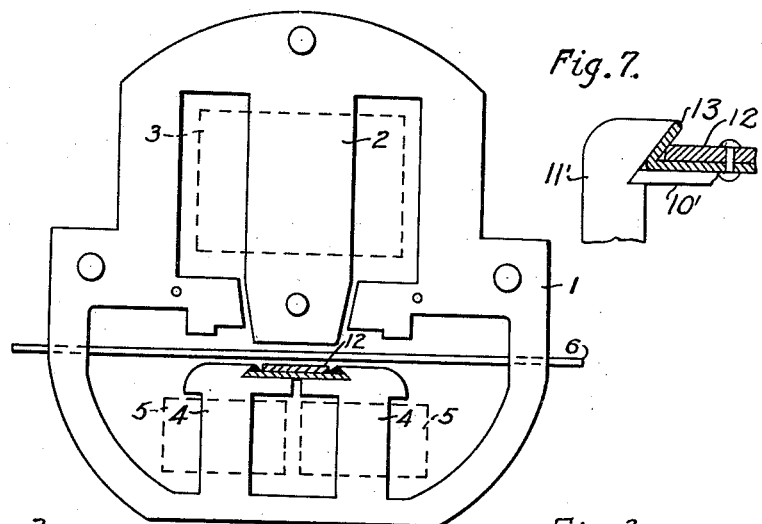
Figure 1 is a view in elevation, with parts in section, of an electromagnet embodying my invention.

Referring to the drawing, Fig. 1 discloses an electromagnet core 1, usually formed of laminated iron, provided with a polar extension 2 about which is positioned a potential coil 3 shown in dotted lines. The electromagnet core 1 also carries a pair of polar extensions 4 which are provided with current coils 5 also shown in dotted lines. Between the polar extensions 2 and 4 is positioned an electro-conductive disk 6 which is mounted for rotation by the flux produced in the gap between the extensions 2, 4 by the coils 3, 5. The construction thus far described is substantially similar to the constructions ordinarily employed in conventional types of watt-hour meters.

Figure 2:
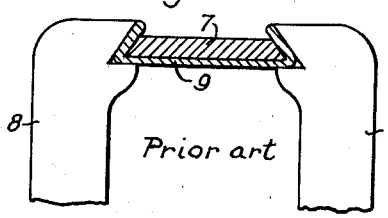
Fig. 2 is a fragmentary view in elevation, with parts in section, of a pair of pole members provided with a prior art shunt.

In order to compensate for errors due to overloading of the structure shown in Fig. 1, it has been customary to place a magnetic saturable shunt between the polar extensions 4. An example of this prior art shunt is shown in Fig. 2, wherein a shunt 7 is shown in position between a pair of current pole members 8. The shunt is spaced from the pole members 8 by means of a non-magnetic spacer 9 which, for example, may be of brass. The shunt 7 is so positioned with reference to the pole members that substantially all of the flux which it receives enters through the edges of the shunt. Consequently, the flux distribution throughout the entire shunt is relatively uniform and the shunt saturates essentially as a unit as the magnetic flux passing therethrough increases.

Figure 3:
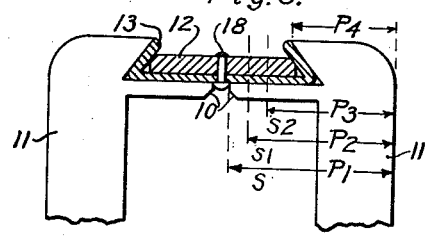
Fig. 3 is a detail view in elevation, with parts in section, of a pair of pole members provided with my improved shunt construction.

In order to extend the range of correction of such a shunt, I provide magnetic extensions or auxiliary pole shoes 10 between a pair of pole members 11 having main pole faces P4 as shown in Fig. 3. Above these extensions, that is, between them and the disk, I locate a magnetic, saturable shunt member 12 which is spaced from the pole members 11 and the extensions 10 by a non-magnetic spacer 13 which may be constructed of brass. The shunt 12 now not only receives flux through its edges, but also through its lower face from the extensions 10. These extensions so modify the flux distribution in the shunt 12 that the shunt has a maximum flux density at its center, and a gradually decreasing flux density towards its ends. This may be readily understood by reference to Fig. 3. The pole members 11 may be the series or current poles of a watt-hour meter, and correspond to the polar extensions 4 of Fig. 1.

For explanatory purposes, in Fig. 3 the shunt is shown as broken up into a plurality of sections S, S1 and S2. The first section receives flux from the entire magnetic extension 10 and the pole member 11 to the right of that section. Similarly, the section S1 receives flux from that part of the extension and the pole member 11 to the right of the section S1, and a similar statement holds for the section S2. It will be noted that the section S receives part of its flux from the portion of the extension lying between the sections S, S1. Consequently, the section S will have a flux density greater than that present in the section S1 by the amount due to the flux received from the portion of the extension 10 lying between the sections S, S1, and greater than the flux density in the section S2 by the amount of flux entering the shunt through the portion of the extension 10 lying between the sections S and S2. Thus the shunt has a variation in flux density which causes it to saturate first in the section S and then gradually outwardly towards the sections S1 and S2.

As the shunt saturates several control actions are produced. In the first place, according to my theory, the gradual saturation causes a gradual and controllable decrease in the amount of flux bypassed through the shunt and a corresponding increase in the proportion of the flux leaving the main pole faces P4. The shunt also gradually extends a zone of greater reluctance over the extensions 10 and therefore decreases the proportion of leakage flux entering the disk 6 from the extensions 10. The various actions of the shunt are such that the effective pole face of each pole member 11 tends to fall from a value P1 as shown in Fig. 3 gradually towards a value P4. It will be noted that the final pole face P4 has an effective distance from the axis of rotation of the disk 6 that is greater than the corresponding distance for the pole face P1. Consequently, the effective torque arm for the flux emanating from the pole face P4 is greater, and the increased control effect of my shunt is partly due to this extension of the torque arm. The theory which I have evolved for the behavior of this shunt is more fully presented in my above-mentioned application. For best results, the magnetic extensions 10 should underlie an appreciable portion of the magnetic shunt. As shown in Fig. 3, a small non-magnetic gap is preferably left between the extensions; otherwise the shunt would be bridged by a solid magnetic section which would decrease the effect of the shunt and the working flux leaving the series pole.

Figure 4:
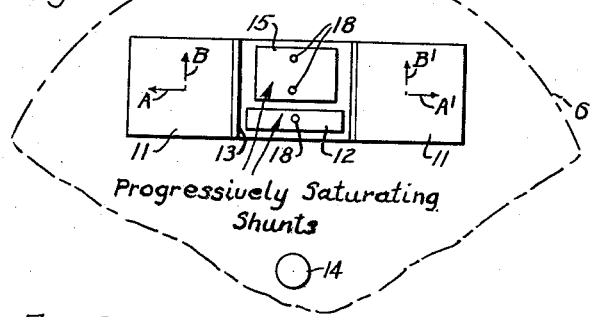
Fig. 4 is a view in plan of the structure shown in Fig. 3.
Figure 6:
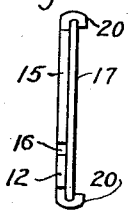
Fig. 6 is a side view of the shunt unit shown in Fig. 5.
Figure 5:
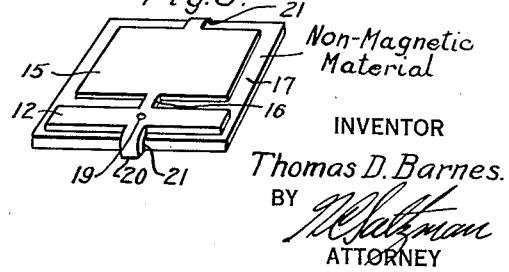
Fig. 5 is a view in perspective of a shunt unit suitable for use in my invention.

I have found that a further control may be exercised by the shunt if it is positioned adjacent one edge of the pole members 11. This construction is shown in Fig. 4, wherein the shunt section 12 is located adjacent the portion of the pole members 11 nearer to the axis 14 of rotation of the disk 6 which is shown in dotted lines. If the shunt section 12 were symmetrically positioned with reference to the pole members 11, as it saturates the flux distribution in the pole faces, i. e., the effective pole faces, would be shifted outwardly in the directions shown by the arrows A, A', but because the shunt section is positioned adjacent one edge of the pole members 11, a second component of shift is introduced as the shunt saturates, and this component is illustrated by the arrows B, B'. The resultant shift of each effective pole face due to the shunt 12 is therefore more nearly in a line directly away from the axis 14 of rotation. This results in a much more effective control of the flux distribution in the pole members 11.

I have also found that a secondary control may be provided by positioning one or more additional shunt members between the same pole members. In Fig. 4, I have shown an additional shunt 15 positioned above the primary shunt member 12. The shunt 15 is proportioned to saturate when the flux passing through the pole members 11 rises above the value necessary to saturate the shunt 12. This may be accomplished in various ways as by making the shunts 12 and 15 of materials having dissimilar magnetic properties, but I prefer, partly for commercial reasons, to make both members of the same material and introduce a non-magnetic gap in series with the shunt 15 which is larger than that in series with the shunt 12. This is done in the arrangement shown in Fig. 4 by increasing the spacing between the edges of the shunt 15 and the pole members 11 above that employed for the shunt 12.

The behavior of the shunt 15 is very similar to that described in connection with Fig. 3 and in my above-mentioned application, but the influence of the shunt 15 is felt only after the shunt 12 has started to saturate. This results in a still further extension of the control effected by my shunt unit.

Although the shunts 12 and 15 may be entirely separate, I prefer for reasons of simplified manufacture to connect them by a minute tie 16. This tie and the shunts may be formed by a stamping from a single sheet of suitable magnetic material. It assures that the shunts will retain any spacing which is initially given to them, and greatly simplifies the problem of locating the shunts on the electromagnet core.

In order to mount the shunts, I prefer to locate them on a sheet of non-magnetic material 17 such as brass. The shunts may be attached to the sheet 17 by means of rivets 18 as shown in Fig. 3, the shunts being provided with suitable holes for this purpose. Or the shunts may be fastened by providing them with one or more tabs 20, the tabs being bent around the brass sheet 17. Although not essential, notches 21 are shown in the sheet 17 for receiving the tabs 20 and positioning the shunt unit. Instead of placing tabs on the shunt structure, the tabs may be formed as part of the sheet 17 and bent around the shunt unit.

The tie member, tabs and holes are so minute that they may be located substantially in any position without materially affecting the flux distribution in the shunts, but I prefer to position them substantially in the neutral plane between the pole members where their influence on the flux distribution is even more negligible. A hole 19 may be provided, if desired, for minimizing the small effect of the tie 16. This hole may also be employed to receive an attaching rivet. If the rivet is of non-magnetic material, such as brass, instead of magnetic iron, the hole still will compensate somewhat for the tie. If a magnetic rivet is employed, it ordinarily would be too small to affect materially the flux distribution between the extensions 10 but a small clearance may be left between the rivet and the extensions.

From the theory which I have developed, the operation of my invention may be recapitulated briefly as follows: When a watt-hour meter embodying my invention is operated under moderate power demands, a portion of the flux in the series or current pole members is diverted through the shunts 12, 15. As the power demand increases, the flux densities in the current pole members and shunts increase until at a certain value, at which the meter ordinarily would under-register, the center zone of the shunt 12 saturates (i. e., operates at decreasing permeability). If the power demand continues to increase gradually, the saturated zone of the shunt 12 enlarges gradually towards the ends of the shunt, with a resulting gradual increase in the proportion of the magnetic flux cutting the disk 6, and a resulting gradual shift of the effective flux in a direction which is the vector sum of the component shifts A, B or A', B'. The combined gradual effect of the greater proportion of flux cutting the disk 6, and the increase in the effective torque arm caused by the shift of this flux compensates for the tendency of the meter to under-register.

As the power demand further increases, the center zone of the shunt 15 (if employed) saturates (operates at decreasing permeability) at a predetermined value, and this saturated zone in turn gradually enlarges towards the ends of the shunt. This also results in an increase in the proportion of the total flux cutting the disk 6 and in a shift of the flux outwardly. Therefore, a continuation of the compensation derived from the shunt 12 is provided by the shunt 15.

By proper selection of the flux values at which the shunts are to start saturating, and by the proper proportioning of the shunts to start saturating at these values, an extended range of accurate operation can be obtained. In certain cases, it may be desirable to omit the magnetic extension 10 underlying either or both the shunts 10 with an accompanying restriction in the corrective control exercised by the shunt unit.

I have shown the extensions 10 as integral with the pole members 11, but they may be formed separately. Furthermore, one of the extensions may be omitted and a single extension used. This construction is shown in Fig. 7 which illustrates a pole member 11' corresponding to the pole 11 of Fig. 3, but provided with a separate magnetic extension 10' underlying the shunt 12 and spacer 13.

Although two shunts are shown in Fig. 4, it is apparent that any number of shunts may be used and designed to saturate in any desired order according to the nature and amount of the errors for which compensation is required.

Wherever the term "saturated" is used, it carries the cannotation of "decremental permeability" or "effective decrease in permeability" or "relatively fast reduction in permeability".

Although I have described my invention with reference to certain specific embodiments thereof, it is obvious that many modifications thereof are possible, and I do not desire my invention to be restricted except as required by the appended claims when interpreted in view of the prior art.

I claim as my invention:

1. In an electromotive device, a magnetic structure for generating a variable magnetic flux, and a magnetic-flux responsive device positioned in the path of said magnetic flux and rotatable with respect to said magnetic structure, said magnetic structure comprising at least two parallel portions designed to saturate at different values of said variable magnetic flux, the portion which saturates first being positioned nearer than the other of said portions to the axis of rotation of said device.

2. In an electromotive device, a magnetic structure for generating a variable magnetic flux, and a magnetic-flux responsive device positioned in the path of said magnetic flux and rotatable with respect to said magnetic structure, said magnetic structure comprising at least two parallel portions designed to saturate at different values of said variable magnetic flux, the portion which saturates first being positioned nearer than the other of said portions to the axis of rotation of said device, and means for controlling the flux distribution in at least one of said portions for causing said last-named portion to saturate progressively in a gradually enlarging section as said variable magnetic flux increases.

3. In an electromotive device, a magnetic structure for generating a variable magnetic flux, and a magnetic-flux responsive device positioned in the path of said magnetic flux and rotatable with respect to said magnetic structure, said magnetic structure comprising at least two parallel portions designed to saturate at different values of said variable magnetic flux, the portion which saturates first being positioned nearer than the other of said portions to the axis of rotation of said device, and means for controlling the flux distribution in at least one of said portions for causing said last-named portion to saturate from a point near said axis of rotation gradually towards a point more distant from said axis of rotation.

4. In an electromotive device, a magnetic structure for generating a variable magnetic flux, a magnetic-flux responsive device positioned in the path of said magnetic flux and rotatable with respect to said magnetic structure, and a magnetic member positioned adjacent said flux-responsive device for bypassing a portion of said magnetic flux away from said device, the portion of the flux bypassed being nearer than the remainder of the magnetic flux to the axis of rotation of said flux-responsive device, said magnetic member being proportioned to saturate within the range of variation of said variable magnetic flux before substantial saturation of any other magnetic part traversed by said variable magnetic flux.

5. In an electromotive device, a magnetic structure for generating a variable magnetic flux, a magnetic-flux responsive device positioned in the path of said magnetic flux and rotatable with respect to said magnetic structure, a magnetic member positioned adjacent said flux responsive device for bypassing a portion of said magnetic flux away from said device, the portion of the flux bypassed being nearer than the remainder of the magnetic flux to the axis of rotation of said flux responsive device, said magnetic member being proportioned to saturate within the range of variation of said variable magnetic flux, and magnetic means underlying a substantial portion of said magnetic member for varying the flux distribution in said member.

6. In an electromotive device, a magnetic structure for generating a variable magnetic flux, a magnetic-flux responsive device positioned in the path of said magnetic flux and rotatable with respect to said magnetic structure, and at least two magnetic elements for bypassing a portion of said magnetic flux away from said device, said elements being designed to saturate at different values of said variable magnetic flux, the element which saturates at the lower value of said magnetic flux being positioned nearer than the other element to the axis of rotation of said device, at least one of said elements being positioned in the path of magnetic flux normally applied to said device.

7. In an induction instrument; a rotatable magnetic-flux responsive disk; a driving means for said disk including a magnetic structure for carrying a variable magnetic flux and having at least two pole members with pole faces lying in a plane adjacent said disk; at least two spaced magnetic shunt elements between said pole members and positioned substantially in said plane, said shunt elements being designed to saturate at different values of said magnetic flux, the element which first saturates being positioned nearer to the axis of rotation of said magnetic-flux responsive disk; and magnetic means extending between said pole members and underlying at least one of said magnetic shunt elements for controlling the density of magnetic flux in at least one of said shunt elements from a low value adjacent one of said pole members to a higher value distant from said pole member for light magnetic flux loadings.

8. In an induction instrument; a rotatable magnetic flux responsive disk; a driving means for said disk including a magnetic structure for carrying a variable magnetic flux and having at least two pole members with pole faces adjacent said disk; a plurality of magnetic members extending between said pole members adjacent said pole faces, a non-magnetic spacer positioned on said magnetic members, and a plurality of spaced magnetic shunt elements positioned on said non-magnetic spacer at different distances from the axis of said disk, said shunt elements being designed to saturate at different values of said variable magnetic flux.

9. In a magnet assembly, a pair of magnet pole members for carrying a variable magnetic flux, at least two spaced magnetic elements in parallel between said pole members, said elements being proportioned to saturate at different values of the magnetic flux carried by said magnet pole members, and magnetic extension means between said pole members, said magnetic extension means underlying a substantial portion of at least one of said elements for varying the flux distribution therein.

10. In a magnet assembly, a pair of magnet pole members for carrying a variable magnetic flux, a unitary shunt structure extending between said magnet pole members, said shunt structure comprising a pair of substantially spaced magnetic elements in parallel between said members, one of said elements having a larger non-magnetic gap in series with said magnetic pole members than the other of said elements, both of said elements being designed to saturate within the range of variation of magnetic flux in said magnet pole members.

11. In a magnet assembly, a pair of magnet pole members for carrying a variable magnetic flux, a shunt structure extending between said magnet pole members, said shunt structure comprising a pair of spaced magnetic elements in parallel between said members, one of said elements having a larger non-magnetic gap in series with said magnetic pole members than the other of said elements, both of said elements being designed to saturate within the range of variation of magnetic flux in said magnet pole members, and magnetic extension means underlying and spaced from, a substantial portion of at least one of said elements for varying the flux distribution therein.

12. A magnetic shunt unit comprising a plurality of spaced magnetic shunt members, and a minute tie element between said shunt members, said members and tie element constituting a unitary structure.

13. In a magnetic shunt unit, a plurality of magnetic shunt members, a minute tie element between said shunt members, said members and tie element constituting a unitary structure, a non-magnetic structure adjacent said unitary structure, and at least one tab element projecting from one of said structures for uniting said structures.

14. A magnetic shunt unit comprising a spacer of non-magnetic material and a plurality of magnetic shunt elements positioned thereon, one of said shunt elements being shorter than the remainder of said shunt elements, and said spacer extending beyond both ends of each of said shunt elements.

THOMAS D. BARNES.